Peter Seyl, Peter Fischer and Philipp Brenner
Antifriction Wheel Box
117211
PATENTED JUL 18 1871
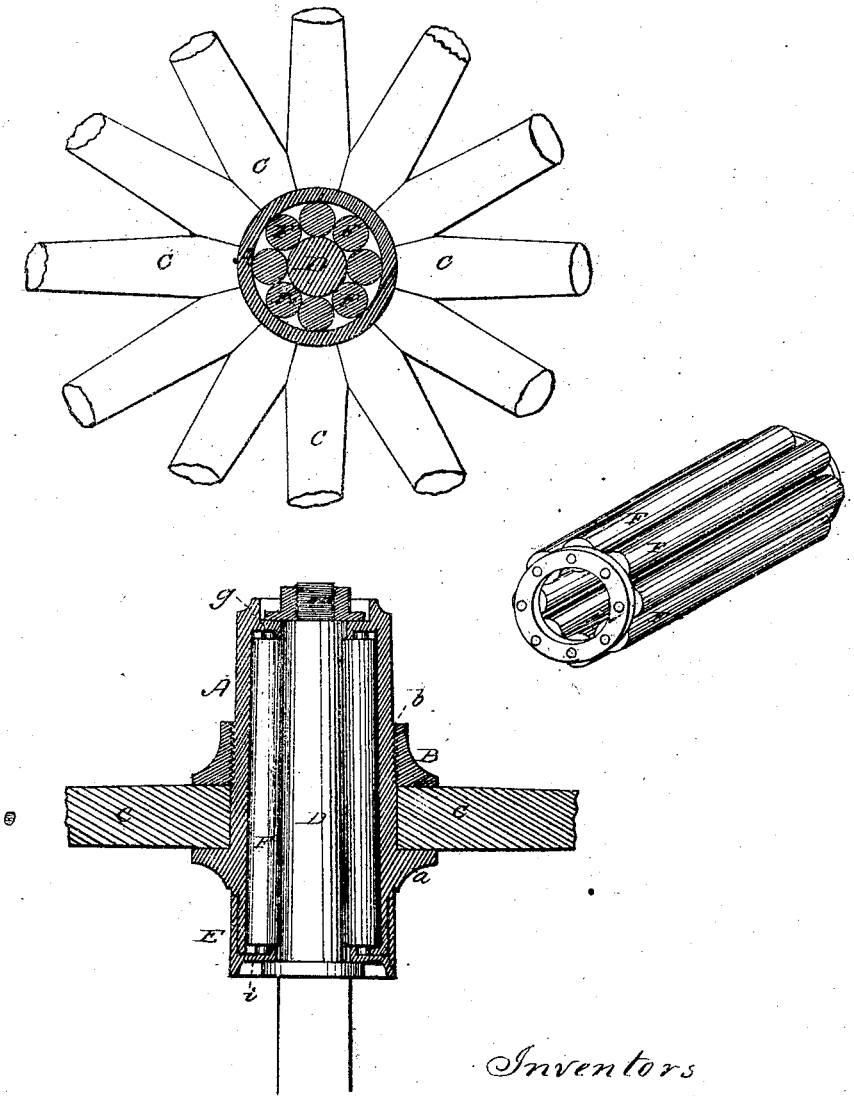
Witness:
H. Fischbeck
B. S. De Forest
Inventors
Peter Seyl
Peter Fischer
Philipp Brenner
by Wm H. Lotz
their Attorney

UNITED STATES PATENT OFFICE.

PETER SEYL, PETER FISCHER, AND PHILIPP BRENNER, OF CHICAGO, ILL.

IMPROVEMENT IN ANTI-FRICTION AXLE-BOXES.

Specification forming part of Letters Patent No. 117,211, dated July 18, 1871.

*To all whom it may concern:*

Be it known that we, PETER SEYL, PETER FISCHER, and PHILIPP BRENNER, of Chicago, in the county of Cook and State of Illinois, have invented certain Improvements in Anti-Friction Axle-Boxes, of which the following is a specification, reference being had to the accompanying drawing.

Our invention consists in a novel manner of constructing a metallic hub, and of mounting anti-friction rollers therein, as hereinafter described.

Figure 1 is a section of a wheel constructed on our plan, the section being taken on the line $x\ x$ of Fig. 2. Fig. 2 is a section on the line $y\ y$ of Fig. 1. Fig. 3 is a view showing a modified arrangement of the rollers.

A represents the body of our hub, made of a tubular form in a single piece, and with a flange, $a$, and a screw-thread, $b$, formed around its middle. B is a ring or plate of equal diameter, with flange $a$ screwed on the thread $b$ on the outside of the hub. C are the spokes of the wheel, having their inner ends fitted together around the hub, between the flange $a$ and ring B, as shown in Figs. 1 and 2. In this manner the spokes are held firmly and rigidly in place, and a much stronger wheel produced than when the spokes are tenoned into a wooden hub in the usual manner. In case the spokes become loose from shrinkage, they may be tightened by screwing up the ring. The ring may be held from unscrewing by a set-screw passed through it into or against the body of the hub. The interior opening of the hub is made much larger than the axle it is to receive; and in its outer end is formed an annular flange, $g$, to fit around the axle D, as shown. E represents a ring fitting around the inner end of the hub, and provided with a flange, $i$, fitting inward around the axle. F are friction-rollers provided with journals $o$ on both ends, and mounted in the hub A around the axle, with their journals bearing in recesses in the end flanges $g$ and $i$, as shown in Figs. 1 and 2.

The rollers thus applied are held by their journals in such manner that while they can turn freely they cannot slip out of position or wedge fast.

Instead of having the journals of the rollers bear in the flanges, they may be mounted in rings, as shown in Fig. 3, so that the whole may be slipped into the hub. In such case the rollers will carry the rings around with them.

By applying the rollers in the manner described I produce a hub which will turn with great ease, and which will wear much longer than any now in use.

Having thus described my invention, what I claim is—

1. A hub for wagons or carriages, consisting of the body A with the inwardly-projecting flange $g$, and the ring E provided with a similar flange, $i$, with the friction-rollers F mounted therein, substantially as described.

2. In combination with a hub, as above described, the ring B applied thereto, as set forth.

PETER SEYL.
PETER FISCHER.
PHILIPP BRENNER.

Witnesses:
   H. FISCHBECK,
   B. S. DE FOREST.